United States Patent
Ge et al.

(10) Patent No.: US 7,792,366 B1
(45) Date of Patent: Sep. 7, 2010

(54) METHOD OF MEASURING AMOUNT OF ECCENTRICITY

(75) Inventors: Zongtao Ge, Saitama (JP); Kenichi Takahashi, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/732,836

(22) Filed: Mar. 26, 2010

(30) Foreign Application Priority Data

Mar. 27, 2009 (JP) .......................... P2009-080213

(51) Int. Cl.
G06K 9/62 (2006.01)
G01B 9/00 (2006.01)

(52) U.S. Cl. ...................... 382/216; 382/220; 382/286; 382/298; 356/390; 356/124; 356/127

(58) Field of Classification Search ......... 356/389–394, 356/124, 124.4, 125–127; 382/100, 126, 382/220, 286, 298; 399/299
See application file for complete search history.

(56) References Cited

U.S. PATENT DOCUMENTS

| | | | | |
|---|---|---|---|---|
| 5,633,951 A | * | 5/1997 | Moshfeghi | .................. 382/154 |
| 6,337,926 B2 | * | 1/2002 | Takahashi et al. | ........... 382/216 |
| 6,480,267 B2 | * | 11/2002 | Yanagi et al. | ................ 356/121 |
| 6,707,954 B1 | * | 3/2004 | Akamatsu et al. | ........... 382/298 |
| 7,072,486 B1 | * | 7/2006 | Akamatsu et al. | ........... 382/100 |
| 7,161,741 B1 | * | 1/2007 | Schaack | ..................... 359/676 |
| 2005/0254864 A1 | * | 11/2005 | Koide | ......................... 399/299 |

FOREIGN PATENT DOCUMENTS

JP  2007-327771 A  12/2007

* cited by examiner

*Primary Examiner*—Sang Nguyen
(74) *Attorney, Agent, or Firm*—Birch, Stewart, Kolasch & Birch, LLP (57) ABSTRACT

An optical element to be measured is irradiated with the light which has passed through an indicator, thereby to form an indicator image on an image pick-up surface. Maximum peak coordinates are specified and stored as a position of the indicator image relating to the first surface. Whether the second largest peak may be specified or not is determined. In case that this result is NO, the maximum peak indicator image is deleted, and maximum peak coordinates are specified again and stored as a position of the indicator image relating to the second surface.

2 Claims, 9 Drawing Sheets

METHOD OF MEASURING AMOUNT OF ECCENTRICITY

The present application claims priority from Japanese Patent Application No. 2009-080213 filed on Mar. 27, 2009, the entire content of which is incorporated herein by reference.

BACKGROUND OF INVENTION

1. Field of the Invention

The present invention relates to a decentration amount measuring method which measures the decentration amount of a surface to be measured of an optical element such as a lens, and particularly to a decentration amount measuring method which may specify the position of each indicator image formed on an image forming surface by reflected light from two-sided surfaces of a subject to be measured.

2. Description of the Related Art

As an important item for evaluation or check of a lens, there is measurement of the decentration amount of a lens surface.

Figure 13:
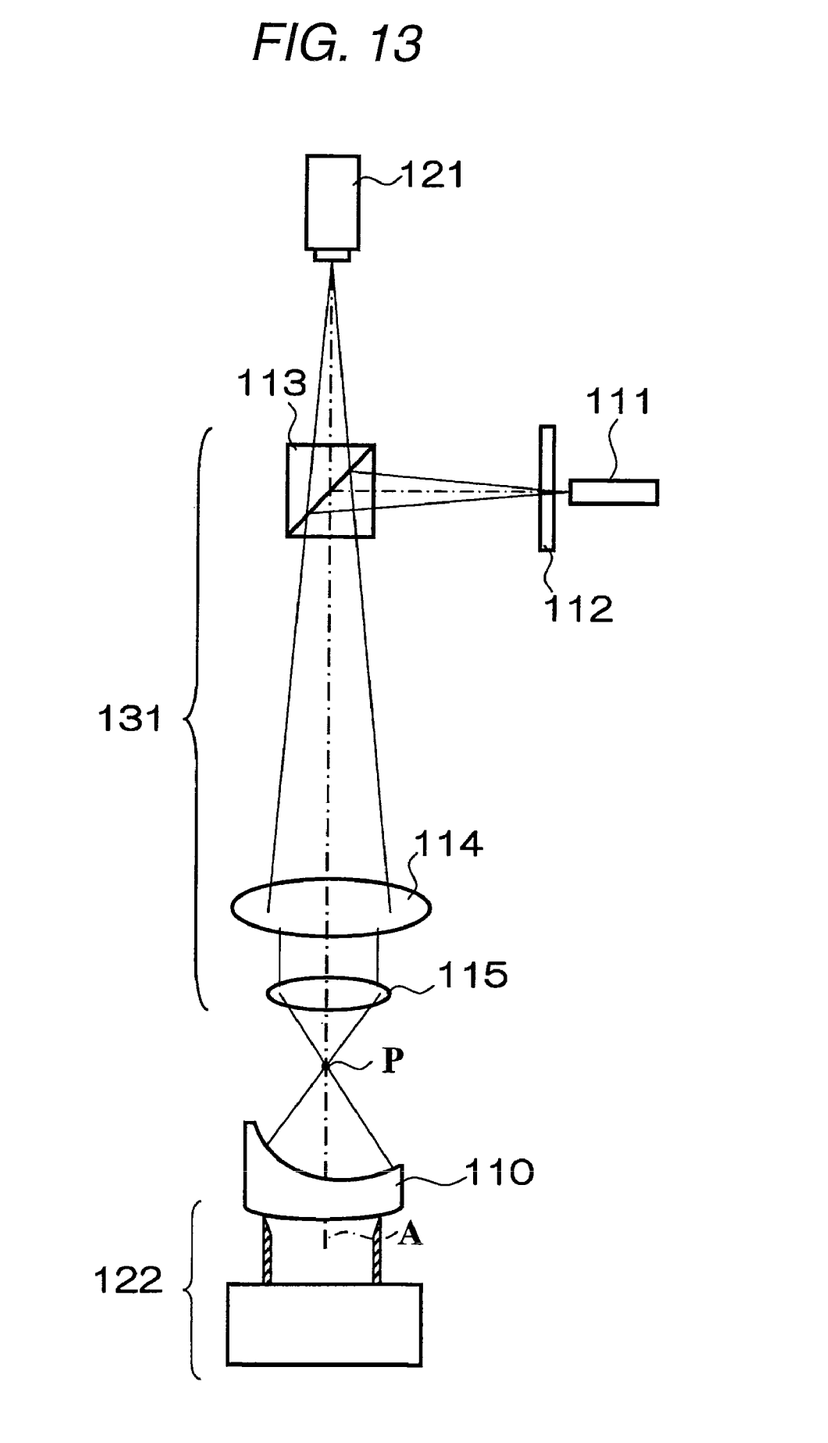
FIG. 13 is a schematic view showing a related decentration amount measuring apparatus.

As a method of measuring the decentration amount, for example, there has been known a method called autocollimation which uses a reflection-type decentration measuring apparatus shown in FIG. 13 (JP-A-2007-327771). This decentration measuring apparatus includes a mount 122 on which a lens to be measured (spherical lens) 110 is set rotatably with its center axis as a center, a light source 111, an indicator plate (pinhole plate, reticle plate) 112 which transmits the light from the light source 111, a measuring optical system 131 which irradiates the lens 110 with the light along the optical axis, and an image pick-up means for observing the light from the lens 110. Further, the measuring optical system 131 includes a beam splitter 113 which reflects the light which has been emitted from the light source 111 and has passed through the indicator plate 112 at the nearly right angle, a collimator lens 114 which makes the light from the beam splitter 113 into parallel beam, and an objective lens 115 which makes this parallel beam converge on a paraxial focus of the lens 110. Further, the image pick-up means is constituted by a CCD camera 121 having an image pick-up surface which observes the light from the lens 110 which has passes through the beam splitter 113.

When the amount of decentration is measured using the above decentration measuring apparatus, the lens 110 is irradiated with the light from the light source 111 which has passed through the indicator plate 112 by the measuring optical system 131.

At this time, by moving an optical converging position P of the objective lens 115, the optical converging position P is matched with the center of curvature of the surface to be measured (upper surface) of the lens 110. The light which has entered the surface to be measured of the lens 110, since it is regarded as equivalent to the light emitted from the center of curvature of this surface to be measured, is reflected from the surface to be measured so as to move reversely the incident path. This reflection light is made to enter the CCD camera 121 through the beam splitter 113. Thereafter, when the reflection image from the lens 110 is observed while the mount 122 is being rotated, in case that there is decentration, a locus of the pinhole images draws a circle. By calculating the radius of this circle, the decentration amount of the lens 110 may be found.

In the lens 110, a lower surface to be measured (setting surface) on the opposite side to the side of the upper surface to be measured is supported on the mount. Since this lower surface is also a spherical surface, even in case that the lens 110 is shifted on the mount 122, the position of the center of curvature of the lower surface does not change basically. In such the decentration measuring apparatus, the obtained measurement value of the decentration amount is taken as the final decentration amount of the surface to be measured as it is.

However, in case that the decentration amount of the lens 110 is found by the above method, two indicator images by the reflection light from the two-sided surfaces of the subject to be measured are formed on the image pick-up surface, and there is possibility that their images overlap with each other. Therefore, it is difficult to measure accurately the decentration amount of each surface on the basis of the indicator image.

SUMMARY OF INVENTION

The invention has been made in view of the above circumstances, and it is an object of the invention to prevent, in case that the decentration amount of an optical element to be measured is measured using autocollimation, easily erroneous detection of an indicator image on an image forming surface (image pick-up surface) from each surface of the optical element to be measured.

According to an aspect of the invention, an decentration amount measuring method which sets a sample of an optical element on a mounting member which is rotatable around an axis, irradiates two-sided surfaces of the sample with a light from a light source through a measuring optical system including an indicator of a shape, leads a reflection light from the two-sided surfaces of the sample on an image forming surface, obtains a plurality of indicator images formed on an image forming surface by the reflection light, relating to the two-sided surfaces for each of at least three rotary positions on the mounting member, obtains a decentration amount of each of the two-sided surfaces on the basis of the at least three indicator image positions, and measures the decentration amount of the optical element on the basis of difference in decentration amount between the two-sided surfaces, includes the steps: creating a matching reference image m(x, y) which forms a reference shape of one of the plurality of indicator images when the indicator image is detected for each of the rotary positions on the mounting member; performing matching processing between an image n(x, y) on the image forming surface and the matching reference image in (x, y); acquiring a first indicator image having a maximum matching strength as one of the plurality of indicator images of one of the two-sided surfaces of the sample; in case that a position of a second indicator image having a second largest matching strength is specified, acquiring the second indicator image as one of the plurality of indicator images of the other of the two-sided surfaces of the sample; and in case that it is difficult to specify the position of the second indicator image, after deleting the first indicator image from the acquired picture image, performing matching processing between an image n'(x, y) on the image forming surface after the deletion and the matching reference image m(x, y), and acquiring another first indicator image having a maximum matching strength at this time as one of the plurality of indicator images of the other of the two-sided surfaces of the sample.

According to another aspect of the invention, the matching processing uses a phase-only correlation.

There is also possibility that the surface on which the image having larger brightness is formed represents the surface on the opposite side to the light source side. For preventing surely occurrence of the erroneous determination, the reflection intensity of each surface may be previously measured and which surface the indicator image concerns may be determined on the basis of this measurement result.

In the specification of the invention, "matching" is generally a method of image processing called template matching, which means a method of preparing a reference image which becomes a template in order to detect a specified pattern, checking this reference image with an image to be measured, and finding, in case that a pattern matched with the reference image has been detected in this image to be measured, a position of this detected pattern on the image to be measured. Accordingly, in this specification, "matching processing" means processing of executing this method, a "matching reference image" means a reference image which becomes the above template, and further "matching strength" means degree in which the pattern in the image to be measured matches with the reference image when the image to be measured is checked with the reference image.

In the decentration amount measuring method according to the invention, the indicator images from the two-sided surfaces of the subject to be measured, which are formed on the image pick-up surface, are subjected to matching processing. The indicator images are surely identified in response to brightness of the formed images. Hereby, since the positions of the indicator images concerning the two-sided surfaces of the subject to be measured may be specified with high accuracy, the decentration amount of each of the surfaces may be surely detected.

Generally, the surface on which the image having the larger brightness is formed represents the surface on the light source side, and the surface on which the image having the second largest brightness is formed represents the surface on the opposite side to the light source side.

DESCRIPTION OF EXEMPLARY EMBODIMENTS

An embodiment of the invention will be described below in detail referring to the above-mentioned drawings.

Figure 3:
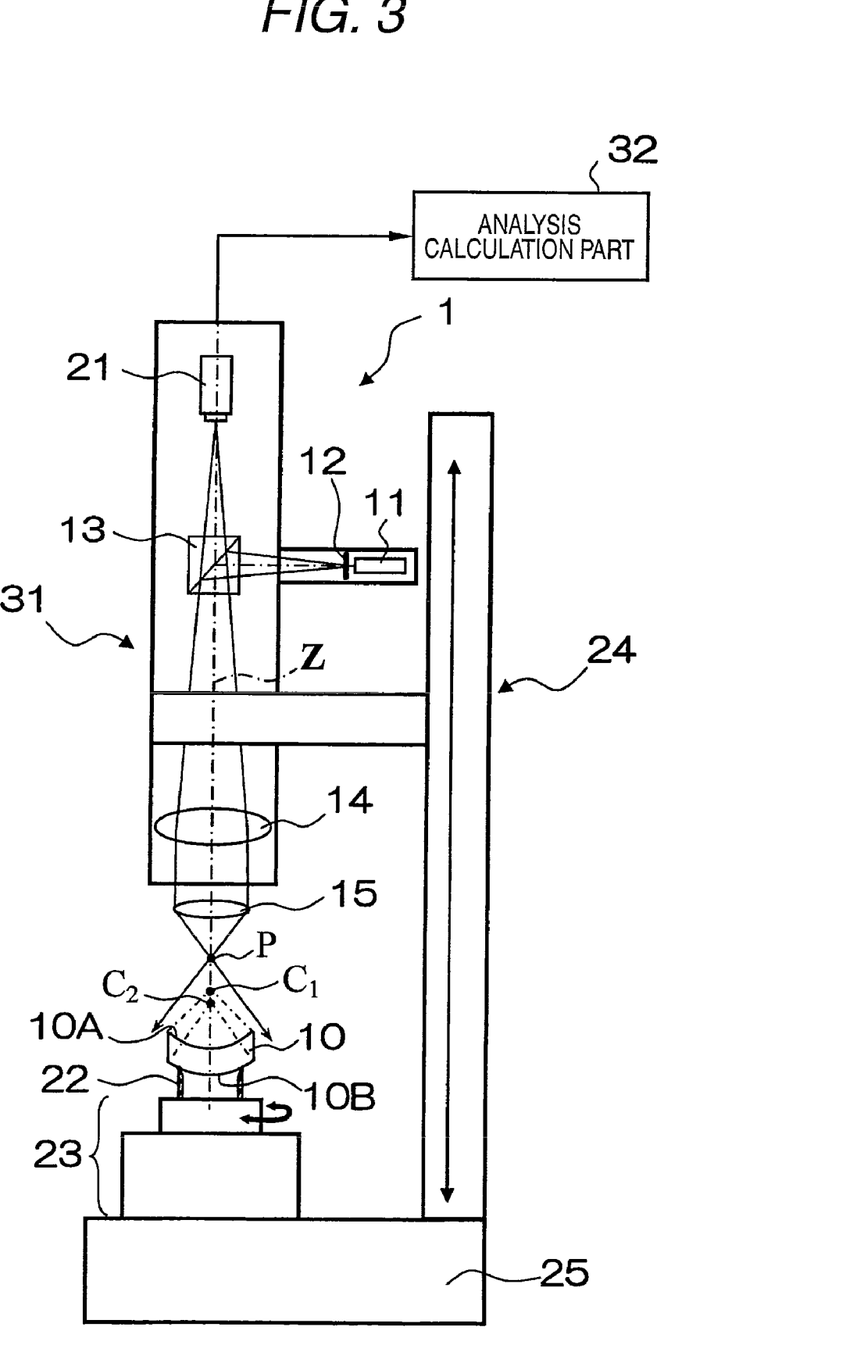
FIG. 3 is a schematic view of a decentration amount measuring apparatus for executing the decentration amount measuring method according to one embodiment of the invention.

First, with reference to FIG. 3, the schematic view of a reflection type decentration amount measuring apparatus for executing a decentration amount measuring method according to one embodiment of the invention will be described.

This decentration amount measuring apparatus 1 is used in order to measure the amount of decentration of a lens to be measured 10, which includes a light source 11 for irradiating an upper surface 10A and a lower surface 10B that become surfaces to be measured with light, a reticle plate 12 which transmits the beam from the light source 11 and has a cross-shaped slit, and a measuring optical system 31. This measuring optical system 31 includes a beam splitter 13 which reflects the light from the reticle plate 12 at the nearly right angle, a collimator lens 14 which makes the incident light into parallel beam, and an objective lens 15 which makes the parallel beam converge on a predetermined position (optical convergence point) P.

Further, in this decentration amount measuring apparatus 1, the reflection light from the upper surface 10A and the lower surface 10B enter through the objective lens 15, the collimator lens 14 and the beam splitter 13, and there is provided a CCD camera 21 which picks up an indicator image of the reticle plate 12.

Further, this decentration amount measuring apparatus 1 includes a lens mounting member 22 which places the lens to be measured 10 thereon, a lens rotation driving unit 23 which rotates this lens mounting member 22 around a predetermined rotary shaft, a z-axis movement stage 24 which moves the moving optical system 31 and the CCD camera 21 in the direction of an optical axis Z of the optical measuring system 31 while holding them integrally, and a fixed mount 25 on which the lens rotation driving unit 23 and the z-axis movement stage 24 are installed and fixed integrally.

Further, there is provided an analysis calculation part 32 which analyzes and calculates the image information obtained by the CCD camera 21.

In case that there is decentration, since the locus of the indicator image draws a circle, the decentration amount of the lens 10 to be measured may be found by measuring the radius of this circle.

Figure 4:
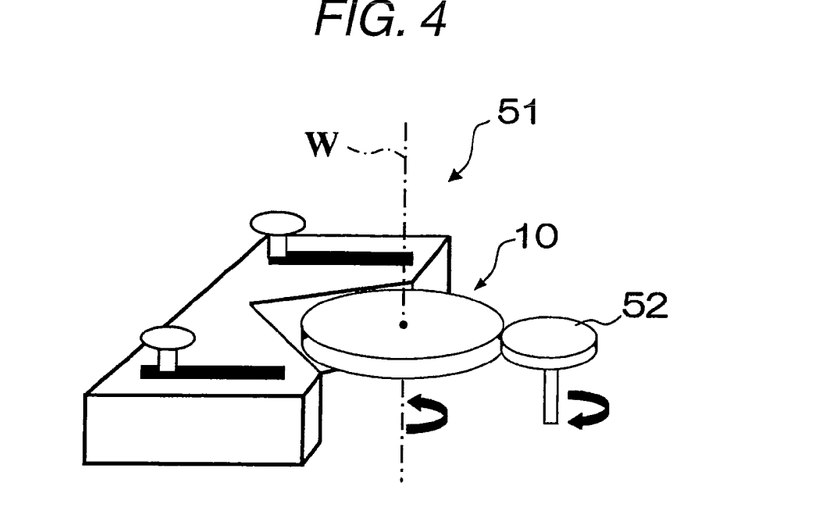
FIG. 4 is a schematic perspective view showing a chuck mechanism composed of a V-block and a rotary disc.

As the lens mounting member 22, though a cylindrical mounting member which supports the lens 10 (absorbs and holds the lens 10 by vacuum chucking) at its upper end surface edge may be used, a chuck mechanism composed of a V-block 51 and a rotary disc 52 as shown in FIG. 4 may be used. When the chuck mechanism pinches the lens 10 at its side, and the rotation of the rotary disc 52 is driven to rotate the lens 10, positioning of the lens 10 may be performed with high accuracy.

In case that the lens 10 is placed by either method, it is desirable that position adjustment is performed so that a rotation axis W of the lens 10 coincides with an optical axis z of the lens 10.

Figure 5:
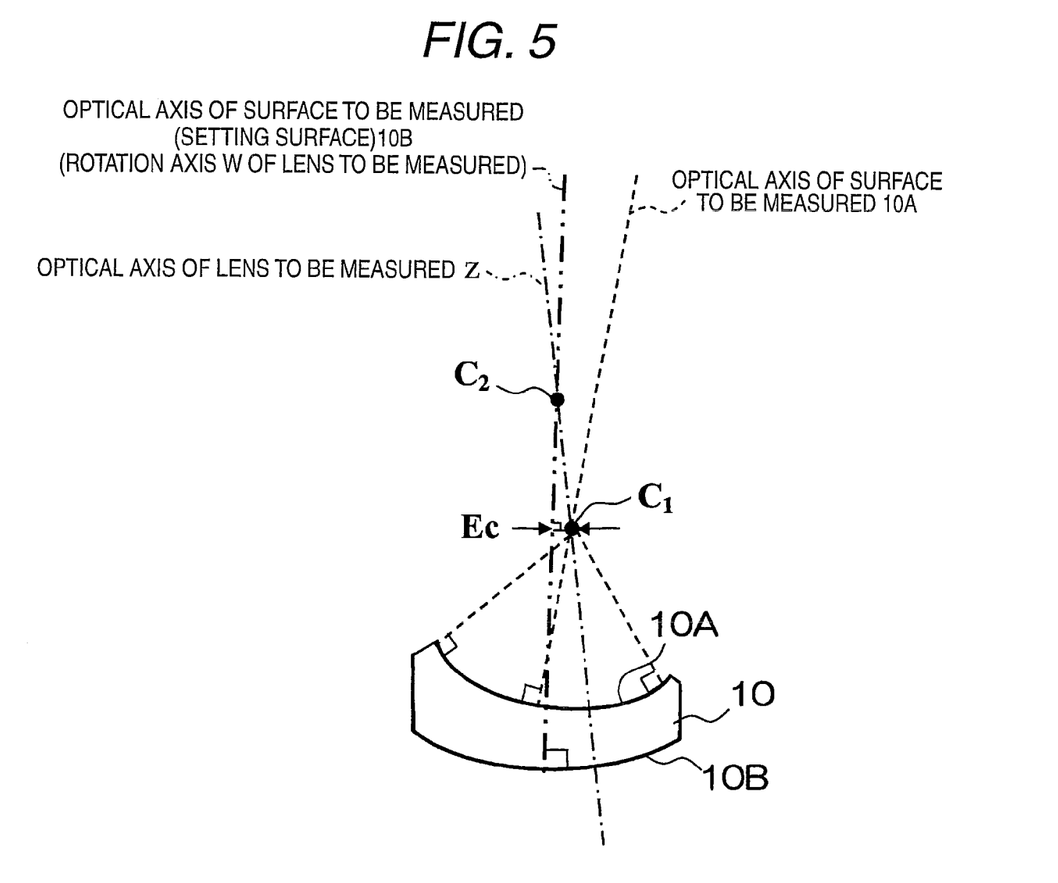
FIG. 5 is a diagram for explaining the definition of the decentration amount Ec.

Here, the decentration amount Ec will be defined with reference to FIG. 5.

Namely, assuming that the both surfaces (upper surface 10A and lower surface 10B) of the lens 10 are spherical surfaces, a center-of-curvature $C_1$ of the upper surface 10A is located on the optical axis of the upper surface 10A, and a center-of-curvature $C_2$ of the lower surface 10B is located on the optical axis of the lower surface 10B. Assuming a straight line connecting the two center-of-curvature $C_1$ and $C_2$ is an optical axis z of the lens 10, and a rotary axis W of the lens 10 coincides with the optical axis of the lower surface 10B, in case that this optical axis z of the lens 10 and the optical axis of the lower surface 10B intersect with an angle, the length of a perpendicular line taken down from the center-of-curvature $C_1$ of the upper surface 10A to the optical axis of the lower surface 10B is defined as the decentration amount Ec. In case that the rotary axis W of the lens 10 does not coincide with the optical axis of the lower surface 10B, the length of a perpendicular line taken down from the center-of-curvature $C_1$ of the upper surface 10A to the rotary axis W of the lens 10 is defined as the decentration amount Ec.

When indicator images by the reflection light from the upper surface 10A and the lower surface 10B are formed in positions on the image pick-up surface which are close to each other, it is difficult to specify automatically which indicator image is formed by the reflection light from the upper surface 10A or the lower surface 10B. Particularly, in case that the shape of the indicator image is the shape of crosshairs, since the both crosshairs-images intersect each other, it may be difficult to differentiate between their images, and is difficult to prevent erroneous measurement of the decentration amount.

Figure 1:
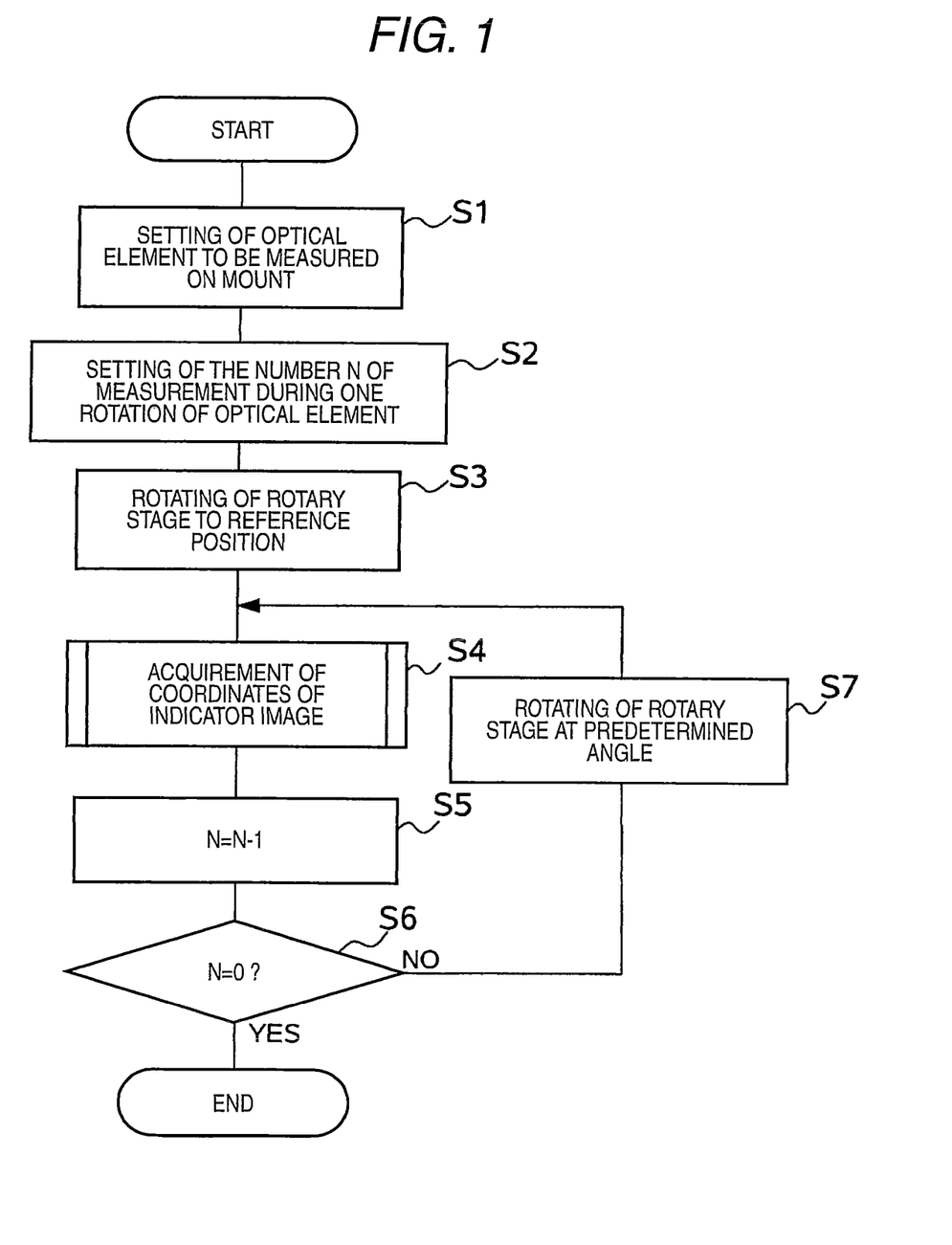
FIG. 1 is a flowchart for explaining the outline of a decentration amount measuring method according to one embodiment of the invention.
Figure 2:
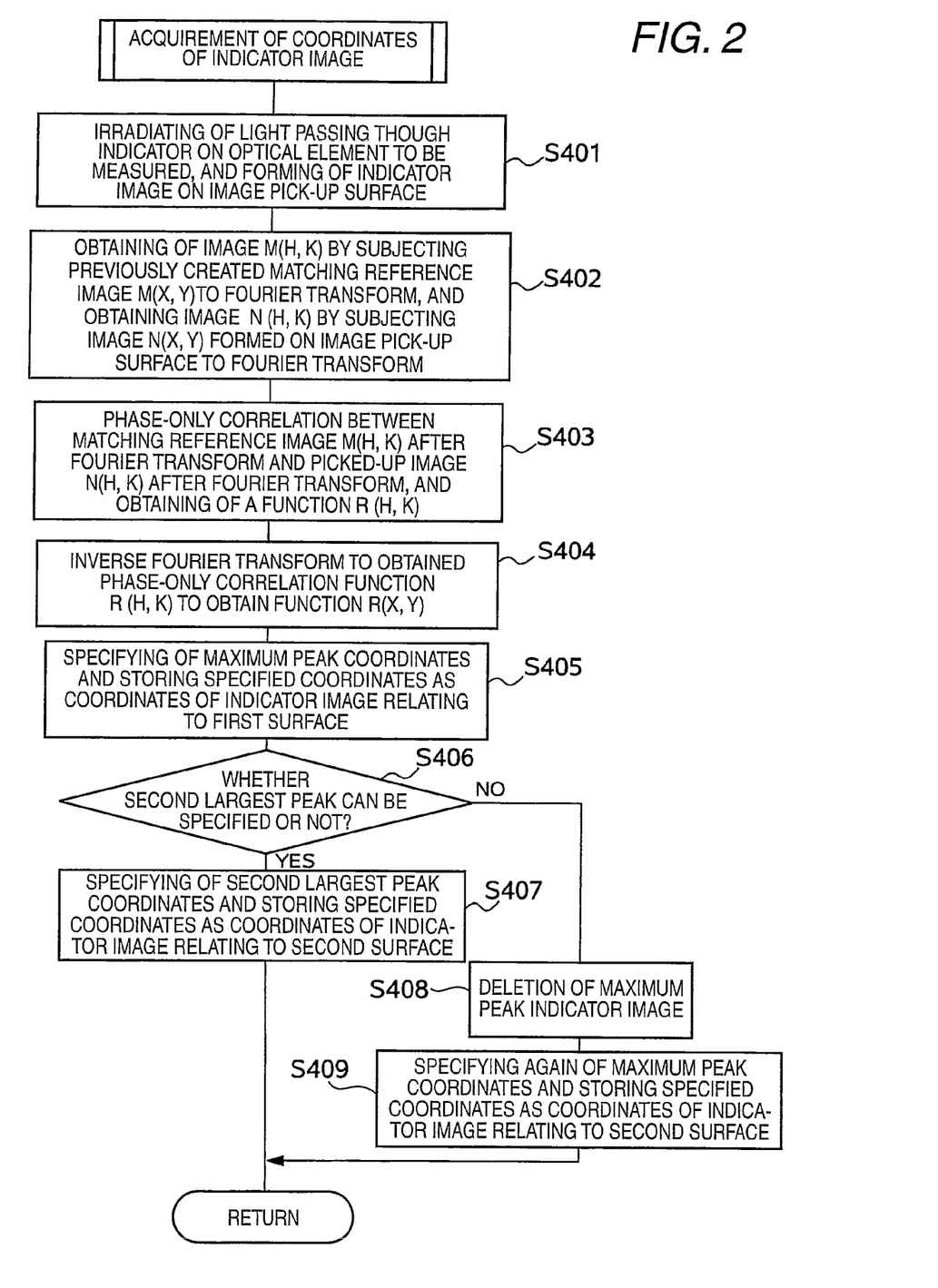
FIG. 2 is a flowchart showing a sub-routine for performing coordinate acquiring processing of an indicator image, shown in FIG. 1.

Therefore, in the embodiment, when the position of each indicator image is specified, the algorisms shown in FIGS. 1 and 2 are used.

Namely, as shown in FIG. 1, in the method of the embodiment, first, as initial setting, the lens 10 (optical element to be measured) is set on the lens mounting member (mount 22) (S1).

Next, as described above, every time the lens 10 (optical element) is rotated at the predetermined angle, the center position of the cross-shaped indicator image is measured; and the number N of measurement during one rotation of the lens 10 is set. Though this number N may be appropriately set by the user, and is, for example, at least two or more, and desirably three or more, its number may be set to several tens in response to the level of measurement accuracy (S2).

Next, the lens rotation driving unit 23 (rotary stage) is rotated to the reference position.

Subsequently, processing of acquiring a coordinate position of the indicator image relating to each lens surface (which becomes the point of the invention) is performed (S4).

Next, only one is subtracted from the number N of measurement set in initial setting in the step S2 (S5), and whether the number N of measurement becomes zero or not is determined (S6). In case that N does not become 0 (in case of NO), the lens rotation driving unit 23 (rotary stage) is rotated at the predetermined angle (N/360 degrees in case that the measurement angle position is set equally) (S7), the operation returns to the step S4, and the steps S4 to S6 are repeated. On the other hand, in case that N becomes 0 (in case of YES), the measurement is completed.

The thus obtained indicator images are acquired at the respective rotary positions, and a center position of each circle (circle of each of the two-sided surfaces) drawn by these images is founded. On the basis of the distance between the center positions of these circles (the length of the perpendicular line taken down from the center-of-curvature $C_1$ to the optical axis of the surface to be measured (setting surface) 10B), the above decentration amount Ec may be found.

The processing (S4) of acquiring the coordinate position of the indicator image relating to each lens surface will be described on the basis of a flowchart shown in FIG. 2 which represents concretely the processing.

Namely, first, the optical element to be measured is irradiated with the light which has passed through the indicator, and the indicator image is formed on the image pick-up surface by the reflection light from each surface of this optical element (S401).

Next, a matching reference image m (x, y) previously created is subjected to FFT (Fast Fourier Transform) processing thereby to obtain an image M (h, k). On the other hand, the image n(x, y) formed on the image pick-up surface (hereinafter referred to as an image to be measured) is subjected to FFT processing thereby to obtain an image N (h, k) (S402).

Next, phase-only correlation between the matching reference image M (h, k) after FFT processing and the image to be measured N (h, k) after FFT processing is taken, thereby to obtain a function R (h, k) (S403).

Next, the obtained phase-only correlation function R (h, k) is subjected to inverse Fourier transform processing thereby to obtain a function r(x, y) (S404).

Next, the maximum peak coordinates are specified and stored as coordinates of the indicator image relating to the first surface (S405).

Next, whether the second largest peak may be specified or not is determined (S406).

In case that its result is YES, the second largest peak coordinates are specified and stored as coordinates of the indicator image relating to the second surface (S407), and the sub-routine processing is completed.

On the other, in case that the above determination result is NO, the maximum peak indicator image is deleted (S408), a maximum peak indicator image is specified again in that state and stored as coordinates of the indicator image relating to the second surface (S409), and the sub-routine processing is completed.

Thus, in case that the second largest peak position is close to the maximum peak position, the indicator image relating to the second largest peak (indicator image relating to the second surface) is hidden by the indicator image relating to the maximum peak (indicator image relating to the first surface) (or becomes difficult to identify) and may be incapable of being recognized clearly. However, in the embodiment, in case that the indicator image relating to the second largest peak (indicator image relating to the second surface) cannot be thus recognized clearly, after the indicator image relating to the maximum peak (indicator image relating to the first surface) has been deleted from the picture image, an indicator image relating to the maximum peak (indicator image relating to the second surface) is recognized again. Therefore, it is possible to specify surely the position of the indicator image relating to the second largest peak (indicator image relating to the second surface).

With reference to image data in the embodiment shown in FIGS. 6 to 11, the steps 402 to 404 (S402 to S404) that are the points of the above method in the embodiment will be more particularly described below.

Figure 6:
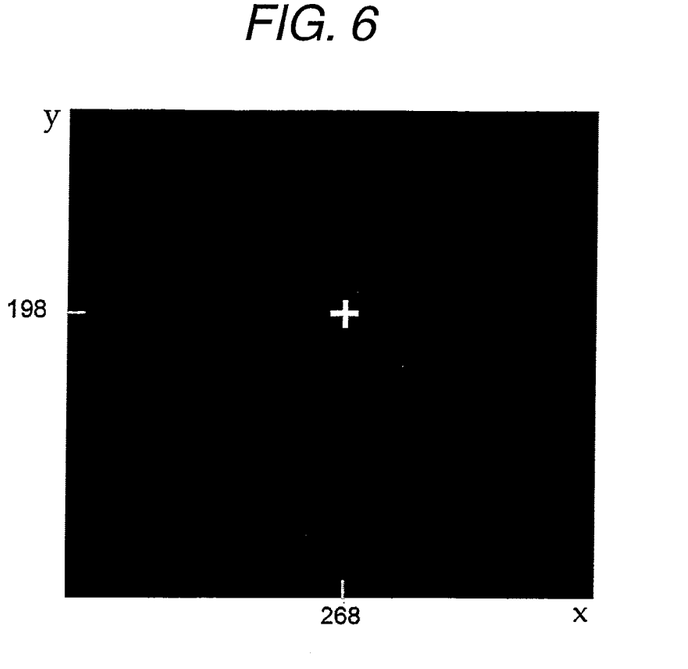
FIG. 6 is a schematic diagram showing a crosshairs—image relating to a matching reference image in the method of the embodiment.
Figure 7:
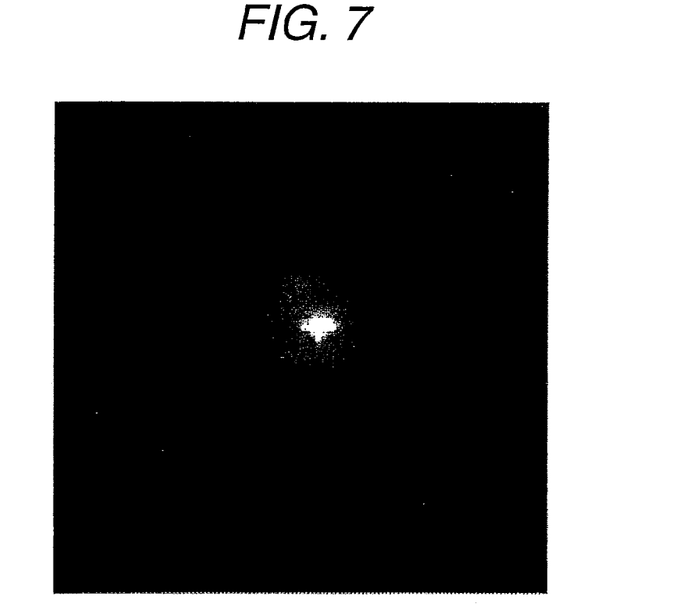
FIG. 7 is a schematic diagram showing two crosshairs—images formed on an image pick-up surface in the method of the embodiment.
Figure 8:
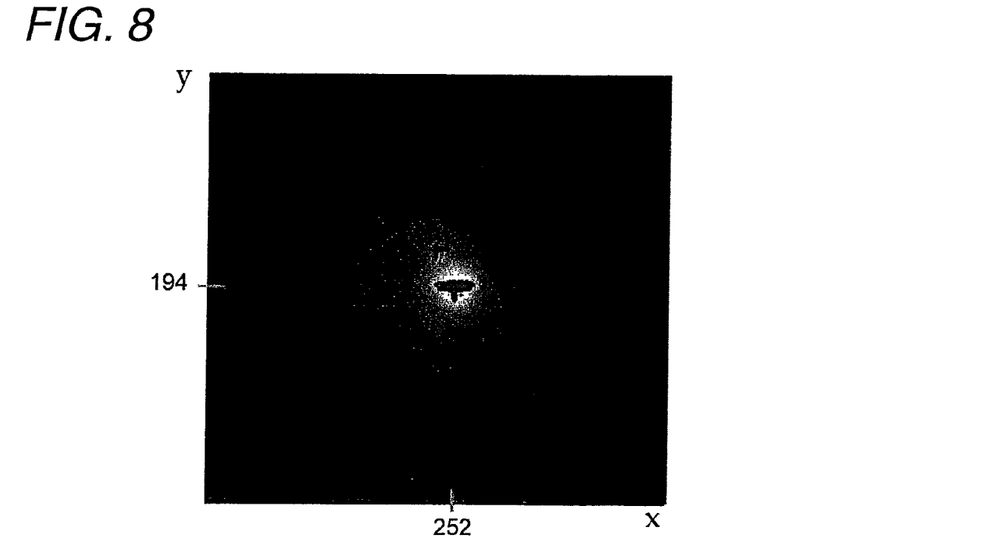
FIG. 8 is a diagram showing a binarized image obtained using dynamic thresholding of Halcon in relation to an image to be measured shown in FIG. 7.

FIG. 6 shows the matching reference image m (x, y) in the step 402 (S402). In this figure, a center position of the indicator image of this matching reference image is located at coordinates (268, 198) (whole pixels 512×512: center coordinates (256, 256)). Similarly, FIG. 7 shows the image to be measured n(x, y) in the step 402 (S402). FIG. 8 shows a binarization image obtained by subjecting this image to be measured to dynamic thresholding of Halcon. A center position of its indicator image is at coordinates (252, 194). In this state, the matching reference image m (x, y) and the image to be measured n(x, y) are subjected to FFT processing, thereby to obtain a matching reference image M (h, k) after this FFT processing and an image to be measured N(h, k) after FFT processing.

Next, as shown in the step 403 (S403), phase-only correlation between the matching reference image M (h, k) after FFT processing and the image to be measured N (h, k) after FFT processing is taken, thereby to obtain a phase-only correlation function R (h, k).

Here, the phase-only correlation method means a method of taking correlation between images (phase-only images) in which amplitude spectrum is normalized to 1. Therefore, in the phase-only correlation method, the correlation may be calculated without receiving change in amplitude spectrum.

The following numerical expression represents the phase-only correlation R (h, k).

[Numerical expression 1]

$$R(h, k) = IDFT\left[\frac{P(u, v)}{|P(u, v)|} \cdot \frac{Q(u, v)^*}{|Q(u, v)|}\right]$$
$$= IDFT[e^{j(\alpha(u,v)-\beta(u,v))}]$$

Figure 9:
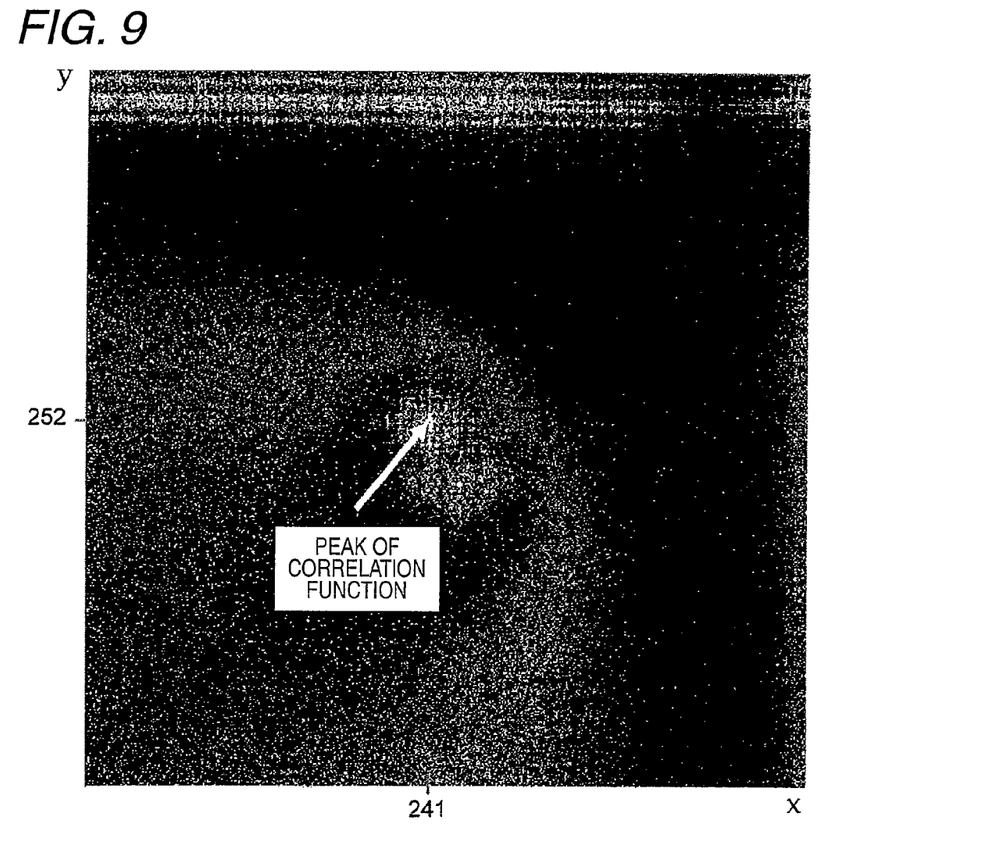
FIG. 9 is a diagram showing an evaluation image by phase-only correlation function r (h, k) in the method of the embodiment.

R(h,k): Phase-only correlation
P(u,v),Q(u,v): Frequency spectrum
Q(u,v)*: Conjugate of Q(u,v)
α(u,v), β(u,v): Phase spectrum
IDFT: Discrete Fourier inverse transform
j: imaginary number Further, in the above step 404 (S404), the obtained phase-only correlation function is subjected to inverse Fourier transform processing, thereby to obtain the phase-only correlation function r(h, k). FIG. 9 shows an evaluation image by this phase-only correlation function r (h, k) (center position coordinates of peak is (241, 252). Thus, in case that there is correlation between the matching reference image and the image to be measured, a high peak appears in a graph shown in FIG. 10 which shows correlation function values ((A) represents correlation function values in a X-section, and (B) represents correlation function values in a Y-section). Therefore, it is known that the indicator image exists in the position where this peak appears. The distance (15, 4) between the position coordinates of its peak (241, 252) and the center position coordinates of the image (origin points 256, 256) coincides substantially with the distance (16, 4) between the center position coordinates (268, 198) of the matching reference image and the center position coordinates (252, 194) of the image to be measured. In the embodiment, by using such the method, regarding both of the indicator image of the subject first surface and the indicator image of the subject second surface, the image position may be exactly detected. Hereby, it is possible to measure with high accuracy the decentration amount of the surface to be measured of the optical element such as the lens.

Thus, the indicator image of the subject first surface and the indicator image of the subject second surface may be taken as indicator images of the two-sided surfaces of the optical lens.

Figure 10A:
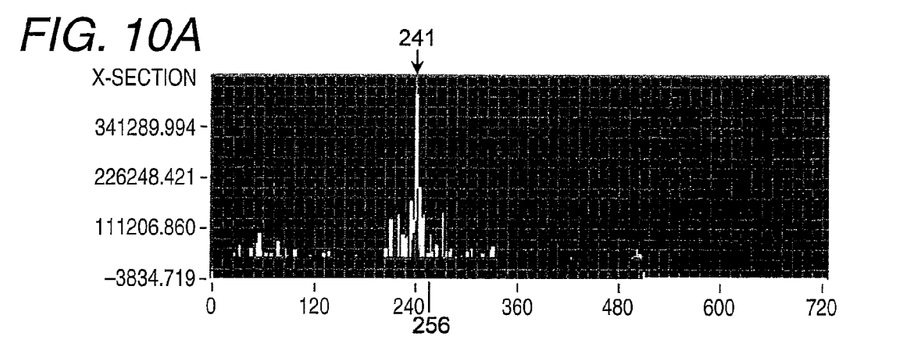
FIG. 10 is a graph showing correlation function values in X and Y directions.
Figure 10B:
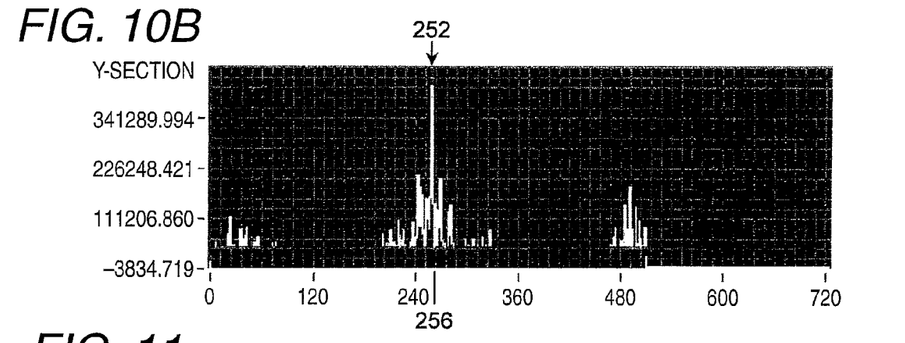

It is difficult to specify the peak value (position where intensity is largest) from the evaluation image shown in FIG. 9. However, as shown in FIG. 10, from the graphs which show the respective correlation function values in the X and Y sectional directions, it is possible to specify exactly the position of the indicator image because the difference in intensity between the peak value and the periphery is large.

Further, since the large peak ranges generally over several pixels, resolving power of sub-pixel is obtained by fitting its peak by quadratic function (it is possible to obtain resolving power of 1/100 pixels in theory).

Figure 11:
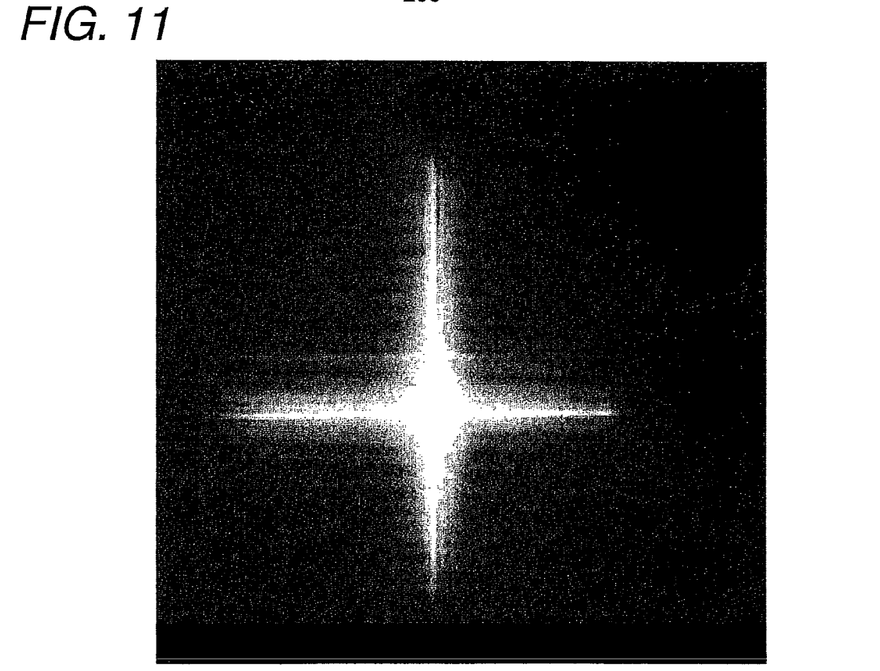
FIG. 11 is a diagram showing a picture image in case that indicator images of crosshairs relating to reflection from the first surface and the second surface are located in positions close to each other.

Further, the method of the invention is effective particularly in case that the indicator is the cross-shaped mark having the long intersecting lines as shown in FIG. 11 and the crosshairs-shaped indicator image relating to the reflection from the second surface is located close to the crosshairs-shaped indicator image, which is strong in intensity, relating to the reflection from the first surface.

Figure 12:
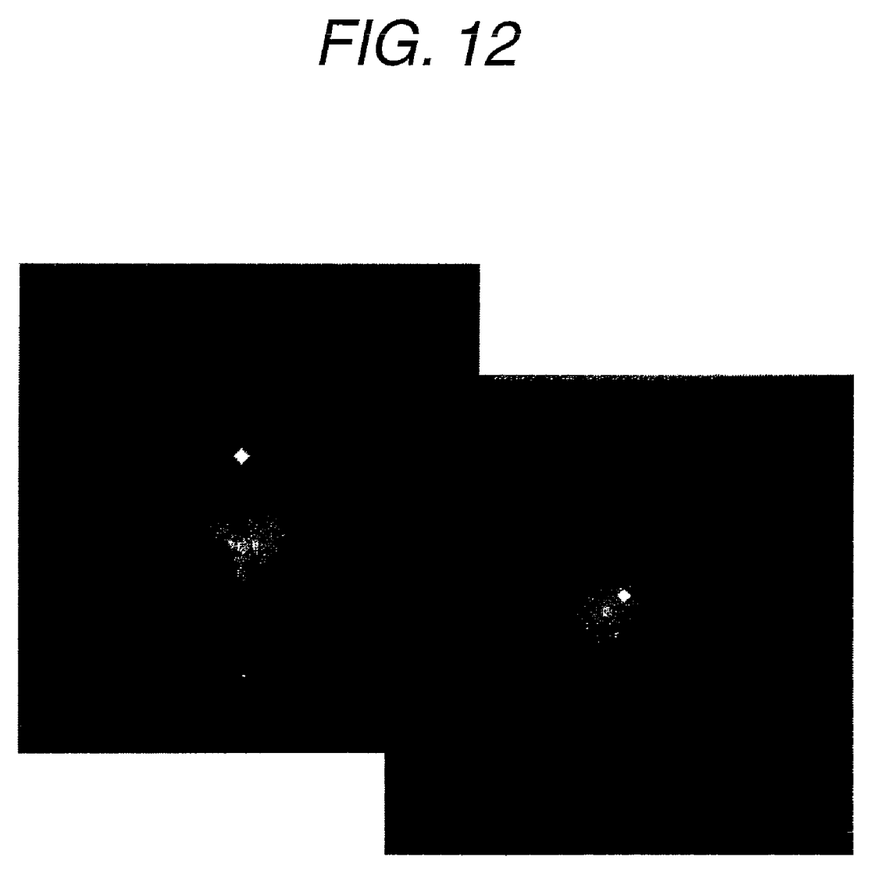
FIG. 12 is diagrams showing images in case that the shape of the indicator is changed to the pinhole shape.

Further, in order to make smaller the adverse effect caused by such the close arrangement of the two indicator images relating to the first surface and the second surface, the shape of the indicator may be changed from the crosshairs to the pinhole shape as shown in FIG. 12, whereby the two indicator images may be recognized not only in the state in left side where the two indicator images are spaced but also in the state in right side where they come close to each other.

Further, the indicator may have such the x-shape that a cross angle of two line segments is an angle other than 90°, for example, 45°, and the indicator image of its shape may be used.

Further, in the above method of the embodiment, though the phase-only correlation is used as matching process, another method may be used.

What is claimed is:

1. An decentration amount measuring method which sets a sample of an optical element on a mounting member which is rotatable around an axis, irradiates two-sided surfaces of the sample with a light from a light source through a measuring optical system including an indicator of a shape, leads a reflection light from the two-sided surfaces of the sample on an image forming surface, obtains a plurality of indicator images formed on an image forming surface by the reflection light, relating to the two-sided surfaces for each of at least three rotary positions on the mounting member, obtains a decentration amount of each of the two-sided surfaces on the basis of the at least three indicator image positions, and measures the decentration amount of the optical element on the basis of difference in decentration amount between the two-sided surfaces, comprising the steps:

creating a matching reference image m(x, y) which forms a reference shape of one of the plurality of indicator images when the indicator image is detected for each of the rotary positions on the mounting member;

performing matching processing between an image n(x, y) on the image forming surface and the matching reference image m (x, y);

acquiring a first indicator image having a maximum matching strength as one of the plurality of indicator images of one of the two-sided surfaces of the sample;

in case that a position of a second indicator image having a second largest matching strength is specified, acquiring the second indicator image as one of the plurality of indicator images of the other of the two-sided surfaces of the sample; and in case that it is difficult to specify the position of the second indicator image, after deleting the first indicator image from the acquired picture image, performing matching processing between an image n'(x, y) on the image forming surface after the deletion and the matching reference image m(x, y), and acquiring another first indicator image having a maximum matching strength at this time as one of the plurality of indicator images of the other of the two-sided surfaces of the sample.

2. The decentration amount measuring method according to claim 1, wherein the matching processing uses a phase-only correlation.

* * * * *